US009251250B2

(12) United States Patent
Hershey et al.

(10) Patent No.: US 9,251,250 B2
(45) Date of Patent: Feb. 2, 2016

(54) METHOD AND APPARATUS FOR PROCESSING TEXT WITH VARIATIONS IN VOCABULARY USAGE

(75) Inventors: John R. Hershey, Winchester, MA (US); Jonathan Le Roux, Somerville, MA (US); Creighton K Heakulani, Cambridge (GB)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 782 days.

(21) Appl. No.: 13/433,111

(22) Filed: Mar. 28, 2012

(65) Prior Publication Data

US 2013/0262083 A1    Oct. 3, 2013

(51) Int. Cl.
*G06F 17/27* (2006.01)
*G06F 17/21* (2006.01)
*G10L 15/00* (2013.01)
*G10L 15/18* (2013.01)
*G06F 17/30* (2006.01)

(52) U.S. Cl.
CPC ...... *G06F 17/30663* (2013.01); *G06F 17/2785* (2013.01)

(58) Field of Classification Search
USPC .............................................. 704/9, 10, 270
See application file for complete search history.

(56) References Cited

U.S. PATENT DOCUMENTS 7,089,226 B1 * 8/2006 Dumais et al. ............... 707/740
7,117,437 B2 * 10/2006 Chen ............................ 704/257
7,130,837 B2 * 10/2006 Tsochantaridis et al. ....... 706/55
8,010,341 B2 * 8/2011 Achan ................. G06F 17/2715
                                                        704/1
8,204,737 B2 * 6/2012 Suominen ............... G10L 15/22
                                                        318/568.11
8,862,573 B2 * 10/2014 Musgrove ..................... 707/722
2002/0140744 A1 * 10/2002 Kanevsky et al. ............ 345/839
2010/0250597 A1 * 9/2010 Yang et al. .................... 707/776
2012/0296637 A1 * 11/2012 Smiley et al. .................... 704/9

OTHER PUBLICATIONS

Paul, "Cross-collection topic models: Automatically comparing and contrasting text", Master's thesis, UIUC, 2009, pp. 1-16.*
D.M. Blei; A.Y. Ng, and M.I. Jordan, "Latent Dirichlet allocation," JMLR, vol. 3, pp. 993-1022, 2003.
J. Boyd-Graber, D. Blei, and X. Zhu, "A topic model for word sense disambiguation," in Proceedings of the Joint Conference on Empirical Methods in Natural Language Processing and Computational National Language Learning (EMNLP-CoNLL), 2007.

(Continued)

*Primary Examiner* — Olujimi Adesanya
(74) *Attorney, Agent, or Firm* — Dirk Brinkman; Gene Vinokur (57) ABSTRACT

Text is processed to construct a model of the text. The text has a shared vocabulary. The text is partitioned into sets and subsets of texts. The usage of the shared vocabulary in two or more sets is different, and the topics of two or more subsets are different. A probabilistic model is defined for the text. The probabilistic model considers each word in the text to be a token having a position and a word value, and the usage of the shared vocabulary, topics, subtopics, and word values for each token in the text are represented using distributions of random variables in the probabilistic model, wherein the random variables are discrete. Parameters are estimated for the model corresponding to the vocabulary usages, the word values, the topics, and the subtopics associated with the words.

12 Claims, 4 Drawing Sheets

(56) References Cited

OTHER PUBLICATIONS

D. Mimno, H.M. Wallach, J. Naradowsky, D.A. Smith, and A. McCallum, "Polylingual topic models," in Proc. Conference on Empirical Methods in Natural Language Processing (EMNLP), Aug. 2009.
J. Boyd-Graber and D. Blei, "Multilingual topic models for unaligned text," in Proc. Twenty-Fifth Conference on Uncertainty in Artificial Intelligence (UAI), Jun. 2009.
S. Crain, S. Yang, H. Zha, and Y. Jiao, "Dialect topic modeling for improved consumer medical search," in AMIA Annual Symposium Proceedings, Nov. 2010, pp. 132-136.
S.H. Yang, S.P. Crain, and H. Zha, "Bridging the language gap: Topic adaptation for documents with different technicality," in Proc. 14th International Conference on Artificial Intelligence and Statistics (AISTATS), Apr. 2011.
D.Blei, T.Griffiths, M.Jordan, and J.Tenenbaum, "The nested Chinese restaurant process and Bayesian nonparametric inference of topic hierarchies," Journal of the ACM, vol. 57. No. 2, pp. 1-30, 2010.
Mahdi Shafiei M. et al. "Latent Dirichlet Co-Clustering," Data Mining 2006, ICDM 06. Sixth International Conference on, IEEE, PI. Dec. 1, 2006, pp. 542-551, XP031003063.
Heaukulani C. et al: "Latent Dirichlet Reallocation for Term Swapping," Mar. 31, 2012, IWSML 2013. XP055066412.

\* cited by examiner

METHOD AND APPARATUS FOR PROCESSING TEXT WITH VARIATIONS IN VOCABULARY USAGE

FIELD OF THE INVENTION

This invention relates generally to processing text, and more particularly to constructing a model for sets of text having different usage of a shared vocabulary.

BACKGROUND OF THE INVENTION

In many practical situations, sections of text with different patterns of vocabulary usage may refer to the same subject matters, whereas they may use different key terms to express the same meanings. For example, different regional dialects of the same language, different levels of formality or technicality in discourse, different styles of writing, represent such differences in vocabulary usage, all of which we may refer to as dialects in a broader sense. An important problem then is: given query terms in one dialect, how can one reliably return relevant sections in different dialects. Solving such a problem would have practical value in information retrieval, where searching for useful information in an unfamiliar domain can be a difficult task with differing key terminology. Examples of such situations are user manuals for different programming languages, user manuals for products of different brands, or course catalogues from different universities.

In statistics, latent Dirichlet allocation (LDA) is a generative model that attempts to find clusters of words known as topics by analyzing the cooccurence of words across documents. LDA and its extensions model each document as a mixture of topics, where each word is generated from one of the topics.

LDA is a generative model, in the sense that it specifies a probabilistic procedure to generate the words in documents. For a given document, a set of multinomial topic probabilities and a set of multinomial probabilities of words, given topics, are drawn from Dirichlet distribution prior probabilities. Then, for each word position in the document, a topic is drawn according to the document's topic probabilities; finally, a word is drawn according to that topic's word probability distribution. However, when observing data, the topic distribution of each document, the probability distribution of words given topics, and the topic that generated each word in the document are not known. Inference in LDA is generally the estimation of the posterior distributions of the topic probabilities in each document, the probabilities of the words given the topics, and the assignments of topics to each word.

Although. LDA itself is not intended to model the dialect dependencies, several extensions of it have been developed for this purpose.

Word-sense disambiguation methods using topic models attempt to learn a polysemantic word's hidden sense according to a predefined labelled hierarchy of words. Other models for multi-lingual corpora require aligned or syntactically similar documents. Other models work on unaligned documents, however, they model corresponding topics in different vocabularies. In comparison, our method is completely unsupervised and models dialects within shared vocabularies.

One related work in these respects is the "dialect topic model" (diaTM), which associates different documents in a corpus with different draws from both a mixture of dialects and a mixture of topics. We are considering applications where each corpus is associated with just one dialect and all corpora share a universal set of topics. However, each corpus can associate different terminologies to each topic. This would account for systematic changes in language across corpora (corresponding to dialects) without imposing differences in the topics. The structure of the "dialect topic model" does not facilitate the formulation of such constraints, as it allows each corpus to define different sets of topics.

Further related works are the topic-adapted latent Dirichlet allocation model (τLDA), which models a technicality hierarchy in parallel with the topic hierarchy, and the hierarchical latent Dirichlet allocation (hLDA) model, which models a tree structured hierarchy for the learned topics using the nested Chinese restaurant process. These models are best suited to address documents of differing levels of specificity (or "technicality"), which is not necessarily the case in the applications we consider.

Another problem with the above methods is that they are unable to directly identify the sets of equivalent terms which vary as a function of the dialect. This indicates a failure to precisely model the inherent constraints of the problem, and could lead to inaccurate results for information retrieval.

SUMMARY OF THE INVENTION

This invention relates generally to processing sets of text. Each set, also called a "corpus," is assumed to comprise subsets of text, also called "documents." All documents inside a corpus are characterized by the same vocabulary usage pattern, also called "dialect," while they may differ in terms of subject matters, also called "topics." Some terms in the vocabulary are equivalent in meaning but differ systematically across dialects. The model can separately characterize the dialect and topic of each document, in order to isolate the component (dialect or topic) of interest for a particular task.

The terms "corpus" and "document" do not constrain what these can refer to. A corpus can be a set of text, and documents are subsets of that text. For example, the corpora can be different books, and the documents can be sections in those books, or each corpus can be a set of messages written by a group of people, and the documents can be paragraphs in that set. Likewise, "topic" and "dialect," as mentioned above, are to be taken in their general sense of subject matter and vocabulary usage, respectively.

The embodiments of the invention provide a probabilistic model for the documents constructed from words in different dialects over a shared vocabulary. Specifically, the model is based on an extension to latent Dirichlet allocation (LDA), called latent Dirichlet reallocation (LDR). LDR is an extension of LDA intended to handle the case where there are multiple corpora characterized by varying vocabulary usage, in the sense that a meaning, which is expressed using a particular word in one corpus, may be expressed using a different word in another corpus, and this difference is not dependent on the specific document within the corpus.

LDR uses a topic model to allocate a distribution over words to each document. In LDR, word placeholders called subtopics are generated from a topic in a dialect-independent way, and subtopics, in turn, generate words in a dialect-dependent way. By way of these subtopics, LDR is able to reallocate word probabilities between variable terms: terms that vary as a function of dialect. In contrast, a vocabulary term is constant with respect to a particular set of dialects if usage of the term is equivalent for all these dialects.

The embodiments provide a method that uses Monte Carlo methods such as Gibbs sampling or hybrid Monte Carlo for inference.

In statistics, Gibbs sampling generates a sequence of samples from a joint probability distribution of two or more random variables. The samples approximate the joint posterior distribution.

DETAILED DESCRIPTION OF THE PREFERRED EMBODIMENT

Introduction

The embodiments of our invention provide an extension to latent Dirichlet allocation (LDA), called latent Dirichlet reallocation (LDR). LDR is an extension of the prior art LDA intended to handle the case where at least some of multiple corpora are characterized by varying vocabulary usage, while other corpora can have the same vocabulary usage. Generally, vocabulary usage, as used herein, pertains to the usage of words in various texts.

In LDR, topic probabilities are still drawn independently from a Dirichlet distribution for each document, and topics are drawn from these distributions for each word position in a document, exactly as in LDA. We consider here each word in the text to be a token having a position and a word value.

However, the LDR topics do not directly generate words, but rather generate placeholders for words that are called subtopics. These subtopics are intended to represent the semantic meaning of the words. Hence, the use of subtopics herein has a special meaning related to semantics not found in prior art text modeling.

The words of each document are then drawn from a probability of the words given the subtopic. These word probabilities are dependent on the vocabulary usage of the corpus (but not on the particular document within the corpus) and allow a given meaning to be expressed by different words, depending on the vocabulary usage of the corpus in which it appears. This is referred to as "reallocation" of the probability for a particular meaning to different words depending on the vocabulary usage.

The probabilities of the words given the subtopics for each dialect are drawn from a Dirichlet distribution, as are the probabilities of the subtopics given the topics. However, the parameters of the Dirichlet distribution for the probabilities of the words given the subtopics are constrained to be sparse, in the sense of having only a few non-zero elements. In statistics, sparsity is a well known term of the art.

This ensures that the number of words in subtopics is small, in the sense that only a few words have significantly non-zero probability for a given subtopic.

Generally, inference in LDR involves estimating the posterior distribution of:

1) the dialect probabilities;
2) the topic probabilities in each document;
3) the probabilities of the subtopics given the topics;
4) the probabilities of the words given the subtopics and dialects;
5) the assignment of dialect to each corpus;
6) the assignment of subtopic to each token; and
7) the assignment of topic to each token.

Relevant prior art is the "dialect topic model," which associates different documents in a corpus with different samples from a mixture of dialects and a mixture of topics. This model suffers from a lack of constraints, in that each dialect has its own set of word-given-topic probabilities. This prevents the topics from being identifiable across dialects.

What differentiates our LDR model is that the topics are constrained to be the same across dialects by means of the dialect-independent subtopic-given-topic probabilities. The word-given-subtopic probabilities are constrained by Dirichlet prior probabilities that are sparse in a dialect-independent way, so that each subtopic can only generate words that belong to a small set, regardless of the dialect. The different structure of the "dialect topic model" does not facilitate the formulation of such constraints.

The prior art dialect topic models can degenerate into independent topic models for each dialect, whereas our LDR model produces topic models that correspond across dialects. In contrast to "topic adaptation," another prior art methodology, our model allocates appropriate probabilities to the terms, and then enables dialect-dependent reallocation of probabilities between a small number of terms. Thus, our model can be used to process documents from different dialects concurrently, as well as infer the dialect corresponding to a previously unseen document. This is not possible with prior art topic adaptation methods.

In this description, the following variables and functions are defined and used.

C: number of corpora
c: corpus index
$D_c$: number of documents in corpus c
d: index of a document in corpus c
z: topic (distribution over subtopics) ($z_i$: topic assignment for token i)
k: topic index
K: number of topics
$\theta_{c,d}$: distribution over topics for document d in corpus c
$\phi_k$: topic-dependent (multinomial) distribution over subtopics for topic k
u: subtopic or meaning (distribution over words) ($u_i$: subtopic assignment for token i)
m: subtopic index
M: number of subtopics
V: vocabulary size
J: average number of terms expected to be variable across all dialects within a subtopic
w: word ($w_i$: word assignment for token i)
$N_{c,d}$: number of words in document d of corpus c
l: dialect ($l_c$: dialect assignment for corpus c)
L: number of dialects
$\psi$: distribution over dialects
$\pi$: scalar parameter for symmetric Dirichlet distributions (over $\psi$)
$\gamma_{l,m}$: multinomial distribution over words for subtopic m and dialect l
$\eta_m$: subtopic-dependent Dirichlet prior probabilities for subtopic m (over $\gamma_{l,m}$)
$\alpha$: scalar parameter for symmetric Dirichlet distributions (over $\theta_{c,d}$)
$\beta$: scalar parameter for symmetric Dirichlet distributions (over $\phi_k$)
$\lambda$: scalar parameterizing an exponential distribution
W: set of all word assignments
Z: set of all topic assignments
U: set of all subtopic assignments
X: random variable Θ: set of all $\theta_{c,d}$
Φ: set of all $\phi_k$
γ: set of all $\gamma_{l,m}$
Dir: Dirichlet distribution
exp: exponential distribution
Mult: multinomial distribution Latent Dirichlet Reallocation In LDR, documents $d=1, \ldots, D_c$ in a corpus $c=1, \ldots, C$ are assumed to be written according to the same corpus-dependent vocabulary usage (or dialect) $l_c \in \{1, \ldots, L\}$ drawn from a corpus-independent multinomial prior distribution. A particular case results from setting the number of dialects to be equal to the number of corpora, and assigning one dialect to each corpus.

We associate each document $d=1, \ldots, D_c$ with a distribution over topics $\theta_{c,d}$ drawn from a Dirichlet distribution, where the topics are shared across all corpora. Here, we associate to each topic $z \in \{1, \ldots, K\}$ a distribution over "subtopics" $u \in \{1, \ldots, M\}$. We associate to each subtopic a distribution over vocabulary terms $\{1, \ldots, V\}$. Our intuition behind the subtopics is described below.

For each token $i=1, \ldots, N_{c,d}$, a topic $z_i=k$ is drawn according to $\theta_{c,d}$. Then, a subtopic $u_i=m$ is drawn from a topic-dependent multinomial $\phi_k$. A vocabulary term is selected from a multinomial $\gamma_{l_c,m}$ depending on both the dialect and the subtopic assignment.

A key feature of our model is subtopic-dependent Dirichlet prior probabilities $\eta_{1:M}$ we place on $\gamma_{1:L,1:M}$. The motivation for this feature is described below.

Generative Model

In detail, we specify, a priori, a number of dialects L, topics K, subtopics M and the vocabulary size V, where K is substantially less than M, which is less than V. The model has three scalar parameters α, β and π for symmetric Dirichlet distributions. A scalar λ parameterizes an exponential distribution.

The generative model is
1. $\eta_m | \lambda \sim \exp(\lambda)$; $m=1, \ldots, M$;
2. $\phi_k | \beta \sim \text{Dir}(\beta)$; $k=1, \ldots, K$;
3. $\psi | \pi \sim \text{Dir}(\pi)$;
4. $\gamma_{l,m} | \eta_m \sim \text{Dir}(\eta_m)$, $m=1, \ldots, M$, $l=1, \ldots, L$;
5. For $c=1, \ldots, C$:
   a) $l_c | \psi \sim \text{Mult}(\psi)$,
   b) $\theta_{c,d} | \alpha \sim \text{Dir}(\theta)$, $d=1, \ldots, D_c$;
6. For $c=1, \ldots, C$, $d=1, \ldots, D_c$, $i=1, \ldots, N_{c,d}$:
   a) $z_{c,d,i} | \theta_{c,d} \sim \text{Mult}(\theta_{c,d})$,
   b) $u_{c,d,i} | z_{c,d,i}; \phi_{1:K} \sim \text{Mult}(\phi_{z_{c,d,i}})$,
   c) $w_{c,d,i} | u_{c,d,i}; \gamma_{l_c,1:M} \sim \text{Mult}(\gamma_{l_c,u_{c,d,i}})$.

For simplicity of this description, the Dirichlet distribution prior probabilities on the $\theta_{1:C,1:D_c}$, $\psi$ and $\phi_{1:K}$ are symmetric. However, in practice, they may be nonsymmetric.

Note that the above generative process is only a definition of the model structure, and that in practice it is not actually used to construct data. It is only assumed that the observed data was generated in this way. The goal of the analysis of the observed data is to estimate the parameters of the model by solving an inverse problem.

Figure 1:
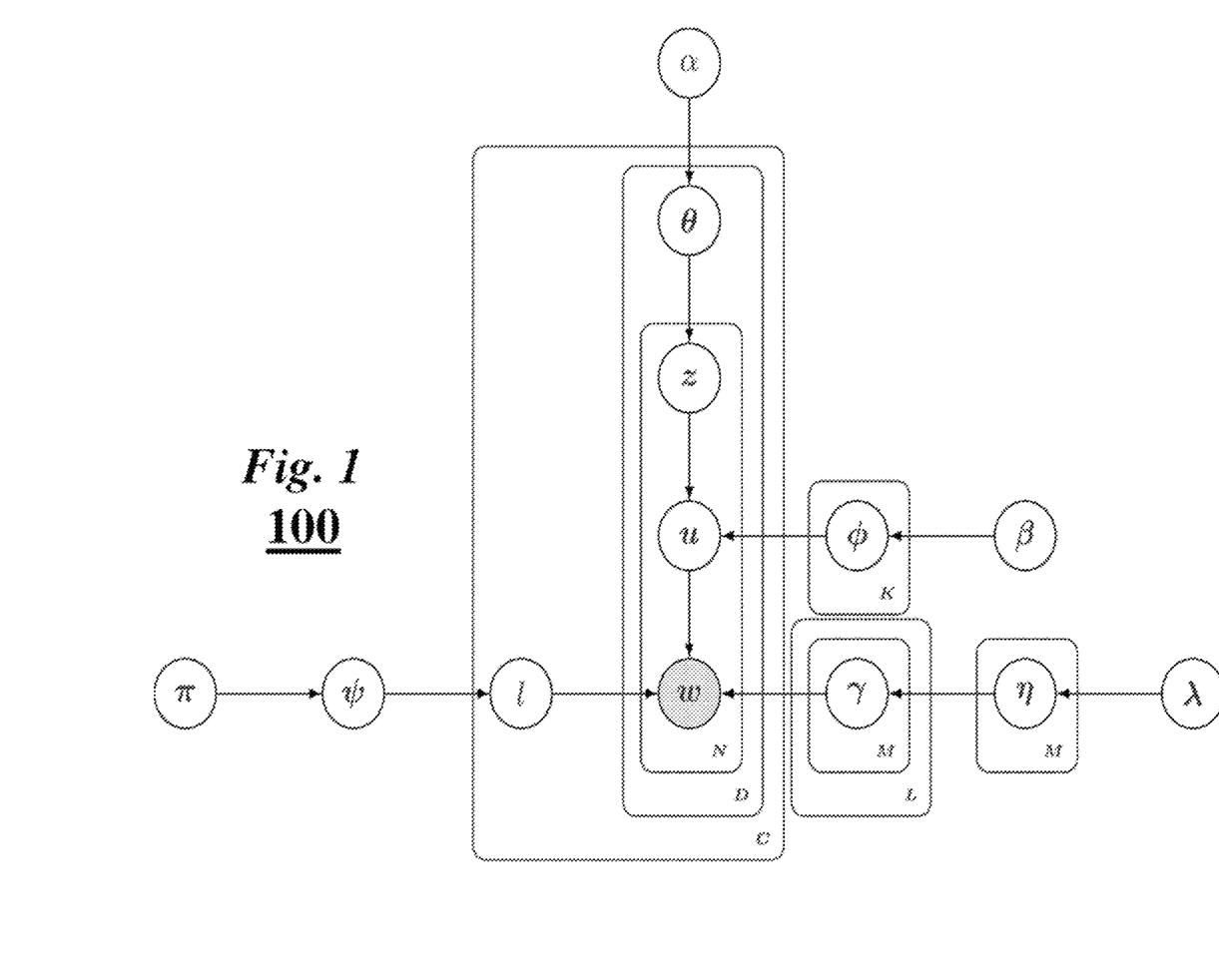
FIG. 1 is a graphical model according to embodiments of the invention.

FIG. 1 shows a graphical model 100 for our LDR, which specifies the statistical dependence relationships between variables. This uses a notation called "plate notation." Each rectangle with a letter "X" in the bottom right corner means that the structure is repeated X times. Here, the big rectangle means the same structure is repeated C times, once for each corpus. Then, inside each corpus c, the structure in the middle-sized rectangle is again repeated D times, once for each document in a corpus, exactly $D_c$, as the number of documents in each corpus can vary across corpora. Then in each document d belonging to corpus c, the innermost structure is repeated N times, once for each word inside that document, exactly $N_{c,d}$, as the number of words in each document can vary across documents. If there is a directed edge connecting A and B, then the random variable B is generated conditionally on A, i.e., according to a distribution which depends on A. This is independent of whether the variables are in the same rectangle or not.

Note that this is not a process diagram. The process that uses this model observes words from a given document and finds the posterior probability distribution, and/or the most likely values of variables of interest, such as the dialect, or the document from a database that best matches the topic distribution.

Figure 2:
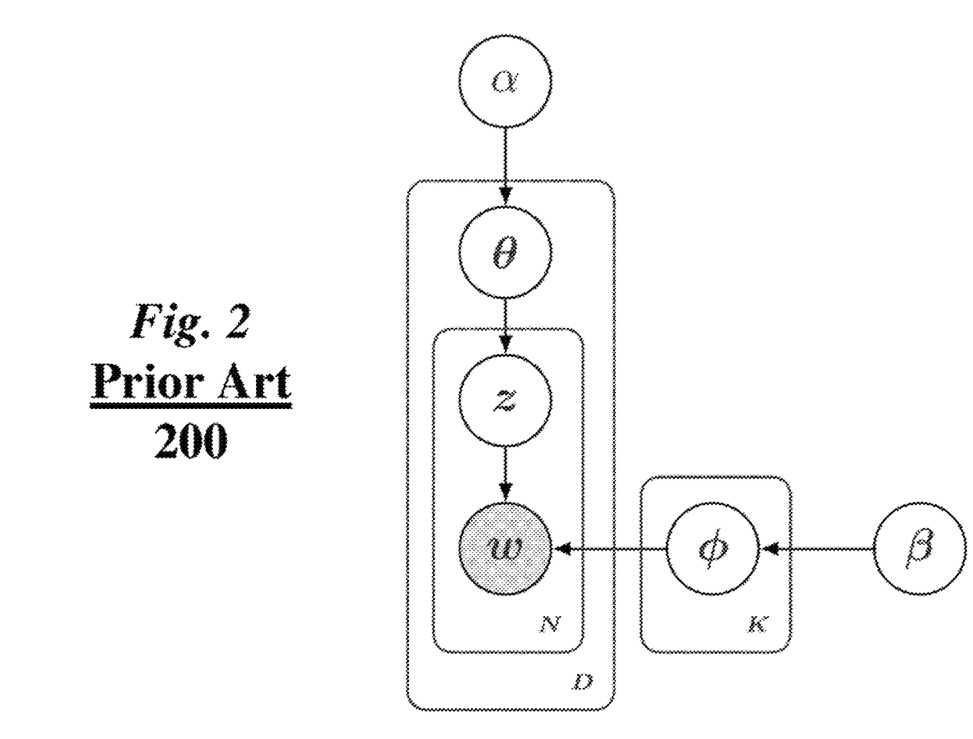
FIG. 2 is a graphical model of a prior art topic model.

FIG. 2 shows a comparable model for the prior art LDA. In that model, the outer rectangle 201 represents documents, and the inner rectangle 202 represents a repeated selection of topics and words within a document.

Modeling Reallocation Between Terms

We now describe the motivation for our LDR, focusing on intuition.

Subtopics Meanings for Words

The M subtopics are intended "meanings" for a word $w_i$. It makes sense to draw the subtopic $u_i$ from a topic-dependent distribution, independent of the dialect, and for the word-probabilities to depend on both the intended meaning of the word and the dialect.

Ideally, every constant term corresponds to its own subtopic. For the variable terms, the model assigns terms that are equivalent in meaning to a group, and associates one subtopic with all terms in the group.

We consider a subtopic associated with a constant term. In this case, the word has already been determined, and an appropriately structured subtopic-dependent multinomial $\gamma_{l_{c_i},u_i}$ does not reallocate the probability to another term. However, when a subtopic corresponding to a variable group is selected, $\gamma_{l_{c_i},u_i}$ correctly reallocate highest probability to the term appropriate for the dialect.

Sparse Dirichlet Distribution Prior Probabilities for Reallocation

We describe our technique for automatically learning the appropriately-structured multinomials.

We automatically learn in an unsupervised manner appropriately-structured multinomials using a Bayesian approach by giving $\gamma_{1:L,1:M}$ a subtopic-dependent, asymmetric Dirichlet distribution prior probability, parameterized by $\eta_{1:M}$.

The Dirichlet distribution is defined over the probability simplex in V−1 dimensions, which is a polytope with each vertex corresponding to a vocabulary term. We want this Dirichlet distribution to be sparse, i.e., for the distribution to place weight on either a (p−1)-face of the polytope (corresponding to p variable terms under subtopic m), or on a single vertex (a constant term under in). The Dirichlet distribution itself is not sparse, but the draws from the distribution favor sparsity.

Hyperprior for Sparse Dirichlet Distributions

A sparse Dirichlet distribution translates to any high-probability vocabulary terms, e.g., j' for subtopic m, having corresponding $\eta_{m,j'}$ larger than all other terms. To encourage this, we place a shared exponential hyperprior over each component of each $\eta_{1:M}$. That is, we assume $\eta_{m,j} \sim \exp\{\lambda\}$, $m=1, \ldots, M$, $j=1, \ldots, V$.

We present a heuristic for setting the scalar λ. If J is the average number of terms, then we expect terms to be varied across all dialects, within a subtopic m. Consider draws from a random variable $X_j \sim$ i.i.d. $\exp(\lambda)$. We want to constrain the expected number of sampled terms greater than one to be J, that is, $E(\Sigma_{t=1}^V 1\{X_t > 1\}) = J$. The corresponding scalar is $\lambda = \log(V) - \log(J)$.

On average, each document within a corpus uses one term, which is varied across dialects. This corresponds to a total of $D = \Sigma_c \Sigma_d 1$ variable terms in the vocabulary, which we expect to be evenly distributed across subtopics. Thus, J=D/M, and $$\lambda \stackrel{set}{=} \log(V) - \log(D) + \log(M).$$

Relaxing Combinatorial Search to Bayesian Reallocation

We describe the problem of learning word equivalence across dialects. Therefore, we form the multinomial probabilities over terms for each dialect (here $\gamma_{1:L}$) to best characterize the dialect. This entails finding an optimal sparse selection of terms to represent variable terms in the dialect. This is a combinatorial optimization problem with a search space equal to the power set of V, which presents a computationally intractable task.

By using a Bayesian approach and subtopic-dependent Dirichlet distribution prior probabilities shared across dialects, we relax the combinatorial search to a continuous optimization, which is automatically performed during inference.

From Meanings to Subtopics

We would like M to be very close to V, and every vocabulary term (or group of variable terms) to have a corresponding word multinomial per dialect, specifying exactly when the term is used. However, this entails fitting LMV≈LV² word-multinomial parameters, which is unreasonable for practical applications. Thus, we decrease the value of M.

Inference and Learning

Unfortunately for our model, the exponential and Dirichlet distributions are not conjugate, so variational inference and Gibbs sampling are not straightforward. Inference can be performed by using a variety of sampling methods such as hybrid Monte-Carlo, collapsed Gibbs sampling or slice sampling.

Figure 3:
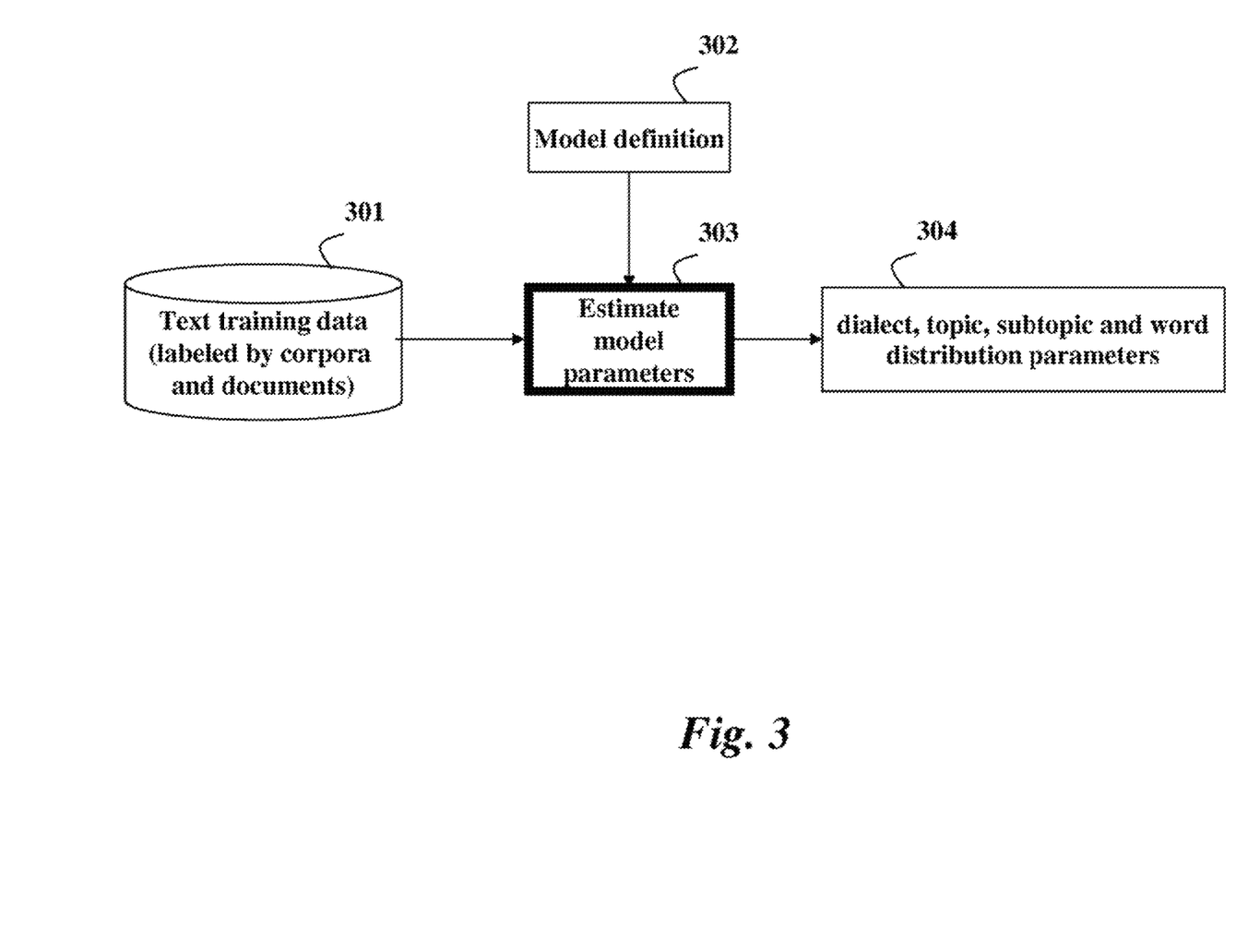
FIG. 3 is a flow diagram of generating a text model according to embodiments of the invention.

FIG. 3 shows the steps of the modeling documents according to embodiments of the invention.

A probabilistic model 302 as embodied in FIG. 1 is used in conjunction with training data 301 comprising text training data labeled by corpora and documents, to estimate 303 model parameters 304 comprising of dialect, topic, subtopic and word distribution parameters.

The above steps can be performed in a processor connected to memory and input/output interfaces as known in the art.

At this point the model can be used for a number of applications, such as dialect estimation, topic estimation, retrieval of topically related documents, document summarization, or other language modeling tasks.

Application

Figure 4:
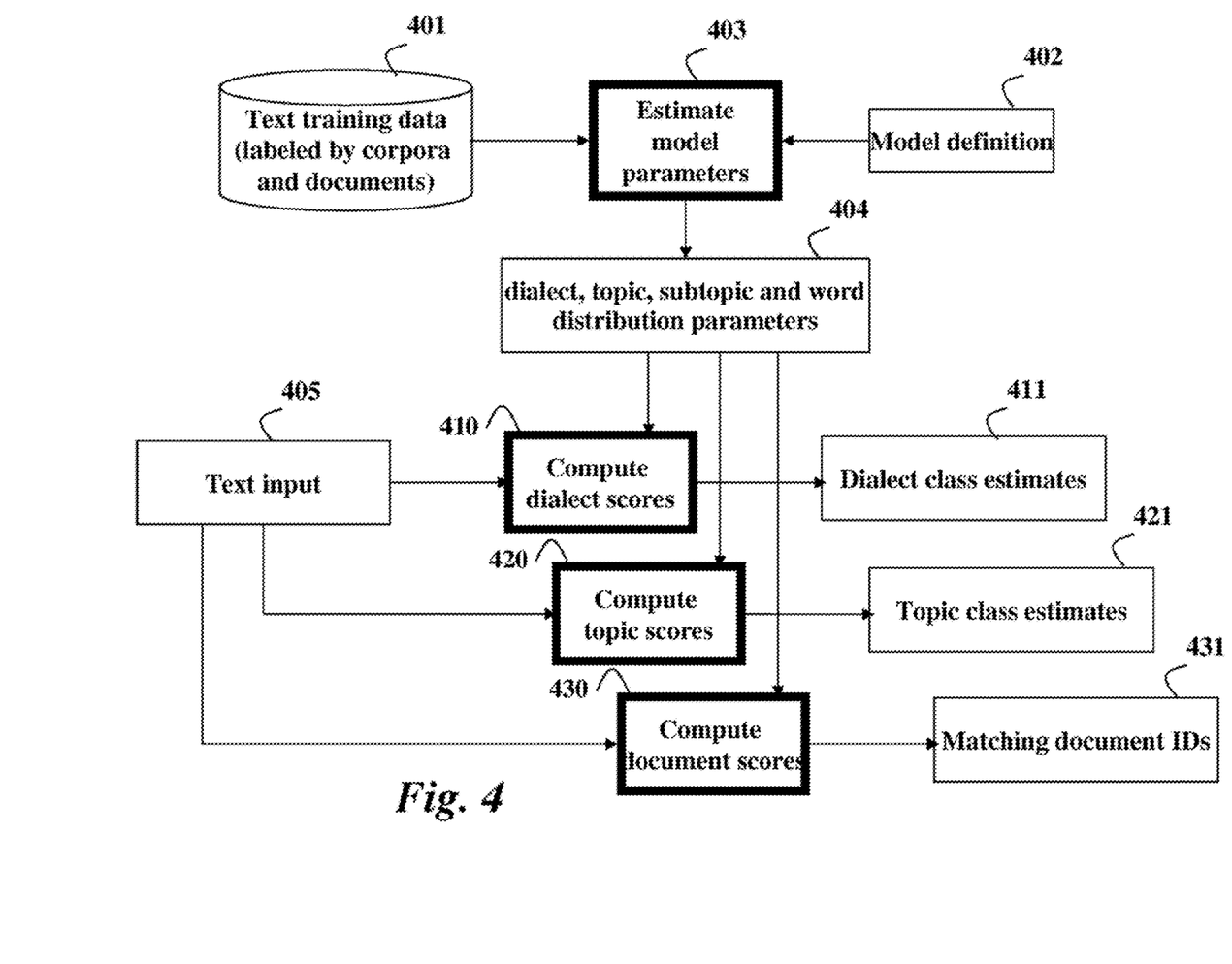
FIG. 4 is a flow diagram of a method for modeling sets of text according to embodiments of the invention.

FIG. 4 shows the use of the invention in example applications. A probabilistic model 402 as embodied in FIG. 1 is used in conjunction with training data 401 comprising text training data labeled by corpora and documents, to estimate 403 model parameters 404 comprising of dialect, topic, subtopic and word distribution parameters.

For dialect estimation, text input 405 is used in conjunction with the model parameters 404 to compute 410 dialect scores from which dialect class estimates 411 are derived.

For topic estimation, text input 405 is used in conjunction with the model parameters 404 to compute 420 topic scores from which topic class estimates 421 are derived.

For document retrieval, text input 405 is used in conjunction with the model parameters 404 to compute 430 document scores from which matching document IDs 431 are derived.

Effect of the Invention

Latent Dirichlet Reallocation can successfully learn a prior probability to characterize documents constructed with different dialects, while not over-fitting.

In a search application, given a query term or document, LDR can be used to associate the term with the most probable documents from each other corpus, according to distributions of document topics.

Alternatively, a linking method, such as a relational topic model, can be used to infer links between any two documents from different corpora. The interpretation being that linked documents cover the same material except in different dialects.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for processing text to construct a model of the text, comprising executing on a processor the steps of:

acquiring an electronic communication containing the text, wherein the text has a shared vocabulary, wherein the text includes words, wherein the text is partitioned into sets of texts and at least one set of text is partitioned into subsets of texts, wherein a usage of the shared vocabulary in two or more sets is different, and the topics of two or more subsets are different;

defining a probabilistic model for the text, wherein the probabilistic model is stored in a memory operatively connected to the processor, and wherein the probabilistic model considers each word in the text to be a token having a position and a word value, and the usage of the shared vocabulary, topics, subtopics, and word values for each token in the text are represented using distributions of random variables in the probabilistic model, wherein the random variables are discrete, wherein each set of text has a vocabulary usage random variable, wherein each token is associated with the random variables corresponding to the topics, the subtopics, and the word values, wherein the distribution of the random variable associated with the topic for the token is dependent on the subset of text including the token, the distribution of the random variable associated with the subtopic for the token is dependent on the topic of the token, and the distribution of the random variable for the word value of the token is dependent on the associated subtopic and the vocabulary usage of the set of texts including the token;

estimating parameters of the probabilistic model, based on the vocabulary usages, the word values, the topics, and the subtopics associated with the words; and classifying a text input using the probabilistic model, wherein the classifying includes one or combination of a dialect estimation, a topic estimation and a document retrieval, wherein for the dialect estimation, the text input is used in conjunction with the estimated parameters of the probabilistic model to compute dialect scores for estimating a dialect class, wherein for the topic estimation, the text input is used in conjunction with the estimated parameters of the probabilistic model to compute topic scores for estimating a topic class, and wherein for the document retrieval, the text input is used in conjunction with the estimated parameters of the probabilistic model to compute document scores for estimating a matching document.

2. The method of claim 1, further comprising:
using the model to perform vocabulary usage estimation.

3. The method of claim 1, wherein each vocabulary usage in the training data corresponds to a dialect.

4. The method of claim 3, further comprising:
using the model to perform dialect estimation.

5. The method of claim 2, further comprising:
performing vocabulary usage estimation to optimize a topic model that is independent of vocabulary usage.

6. The method of claim 1, further comprising:
using the model to perform retrieval of topically related subsets, invariant to vocabulary usage.

7. The method of claim 1, further comprising:
using the model to perform text summarization.

8. The method of claim 1, further comprising:
constraining the distributions of the word assignments given the subtopics to be sparse.

9. The method of claim 1, further comprising:
determining dialect class estimates of an input text using the parameters of the probabilistic model.

10. The method of claim 1, further comprising:
determining topic class estimates of an input text using the parameters of the probabilistic model.

11. The method of claim 1, further comprising:
determining documents matching an input text using the parameters of the probabilistic model.

12. A non-transitory computer-readable memory for processing text, comprising instructions stored thereon, that when executed on a processor, perform the steps of:
acquiring an electronic communication containing the text, wherein the text has a shared vocabulary, wherein the text includes words, wherein the text is partitioned into sets of texts and at least one set of text is partitioned into subsets of texts, wherein a usage of the shared vocabulary in two or more sets is different, and the topics of two or more subsets are different;

defining a probabilistic model for the text, wherein the probabilistic model is stored in a memory operatively connected to the processor, and wherein the probabilistic model considers each word in the text to be a token having a position and a word value, and the usage of the shared vocabulary, topics, subtopics, and word values for each token in the text are represented using distributions of random variables in the probabilistic model, wherein the random variables are discrete, wherein each set of text has a vocabulary usage random variable, wherein each token is associated with the random variables corresponding to the topics, the subtopics, and the word values, wherein the distribution of the random variable associated with the topic for the token is dependent on the subset of text including the token, the distribution of the random variable associated with the subtopic for the token is dependent on the topic of the token, and the distribution of the random variable for the word value of the token is dependent on the associated subtopic and the vocabulary usage of the set of texts including the token;

estimating parameters of the probabilistic model, based on the vocabulary usages, the word values, the topics, and the subtopics associated with the words; and classifying a text input using the probabilistic model, wherein the classifying includes one or combination of a dialect estimation, a topic estimation and a document retrieval, wherein for the dialect estimation, the text input is used in conjunction with the estimated parameters of the probabilistic model to compute dialect scores for estimating a dialect class, wherein for the topic estimation, the text input is used in conjunction with the estimated parameters of the probabilistic model to compute topic scores for estimating a topic class, and wherein for the document retrieval, the text input is used in conjunction with the estimated parameters of the probabilistic model to compute document scores for estimating a matching document.

* * * * *